(12) United States Patent
Hakes (10) Patent No.: US 11,565,760 B2
(45) Date of Patent: Jan. 31, 2023

(54) TRACK ROLLER WITH REDUCED STIFFNESS

(71) Applicant: Caterpillar Inc., Peoria, IL (US)

(72) Inventor: David J. Hakes, Princeville, IL (US)

(73) Assignee: Caterpillar Inc., Peoria, IL (US)

( * ) Notice: Subject to any disclaimer, the term of this patent is extended or adjusted under 35 U.S.C. 154(b) by 639 days.

(21) Appl. No.: 16/681,118

(22) Filed: Nov. 12, 2019

(65) Prior Publication Data

US 2021/0139092 A1     May 13, 2021

(51) Int. Cl.
*B62D 55/14* (2006.01)
*B62D 55/15* (2006.01)

(52) U.S. Cl.
CPC ............. *B62D 55/14* (2013.01); *B62D 55/15* (2013.01)

(58) Field of Classification Search
CPC ................................. B62D 55/14; B62D 55/15
See application file for complete search history.

(56) References Cited

U.S. PATENT DOCUMENTS

| 7,360,950 B2 | 4/2008 | Murabe et al. |
| 9,845,825 B2 | 12/2017 | Shattuck |
| 2017/0369111 A1* | 12/2017 | Recker ................... B62D 55/14 |

FOREIGN PATENT DOCUMENTS

| CN | 1817716 A | * | 8/2006 | ............. B62D 55/15 |
| CN | 101504035 A | | 8/2009 | |
| EP | 3184798 | | 6/2017 | |
| EP | 3184798 A2 | * | 6/2017 | ........... F02M 59/102 |
| JP | H09142341 | | 6/1997 | |
| JP | 2003312558 | | 11/2003 | |
| SU | 931570 | | 5/1982 | |
| SU | 1729887 | | 4/1992 | |

* cited by examiner

*Primary Examiner* — Jacob D Knutson (57) ABSTRACT

A track roller includes a body having an annular configuration defining an axis of rotation, a radial direction, and a circumferential direction disposed about the axis of rotation. The body also defines a thru-hole extending axially through the body that is centered on the axis of rotation. A blind void is disposed annularly about the axis of rotation, the blind void being spaced radially away from the thru-hole a predetermined minimum distance, forming a cantilever portion defining a flex point and a flex radial distance measured radially from the flex point to the thru-hole.

17 Claims, 6 Drawing Sheets

TRACK ROLLER WITH REDUCED STIFFNESS

TECHNICAL FIELD

The present disclosure relates to track rollers used in the undercarriage of heavy equipment using endless track drives. Specifically, the present disclosure relates to a track roller used in such undercarriages.

BACKGROUND

In many current applications, track rollers support the weight of heavy equipment such as those using endless track drives in the earth moving, construction, and mining industries, etc. Often, a bearing is supplied between the shaft on which the track roller rotates and the track roller. The pressure exerted on the bearing may cause the bearing to wear.

Eventually, the bearing wears out and the machine is taken out of service to replace the bearing or otherwise perform maintenance on the undercarriage of the machine. This may result undesirably in increased costs and reduced production for an economic endeavor using the machine.

U.S. Pat. No. 7,033,078 to Murabe et al. discloses a hydrodynamic bearing assembly that provides a high rotation rate in a stable manner with robust rigidity. The hydrodynamic bearing assembly has a total radial gap of 3 microns or less for preventing contact on the thrust bearing. The radial bearing has offset grooves on the surface thereof to supply the fluid flow sufficiently to the thrust bearing. A depth ratio relative to the diameter of the bearing is preferably 0.005 or less to avoid the reduced translation rigidity. The radial gap is smoothly enlarged from the center to both ends along the axis, and the shaft is biased to incline the shaft relative to the sleeve, so that the shaft can be rotated with robust rigidity. Also, a pair of thrust bearings is provided on both ends of the radial bearing to provide robust rigidity.

As can be understood, the '078 patent is directed to a hydrodynamic bearing intended to support low loads at a high rate of rotation. On the other hand, the bearings used in the undercarriages of heavy equipment such as used in the earth moving, construction, and mining industries, etc. are subjected to high loads at a low rate of rotation. Accordingly, there is a need to develop a track roller joint assembly that is suitable for heavy loads and a low rate of rotation.

SUMMARY

A track roller member according to an embodiment of the present disclosure is provided. The track roller may comprise a body including an annular configuration defining an axis of rotation, a radial direction, and a circumferential direction disposed about the axis of rotation. The body may also define a thru-hole extending axially through the body that is centered on the axis of rotation. A blind void may be disposed annularly about the axis of rotation, the blind void being spaced radially away from the thru-hole a predetermined minimum distance, forming a cantilever portion defining a flex point and a flex radial distance measured radially from the flex point to the thru-hole.

A track roller member according to another embodiment of the present disclosure is provided. The track roller member may comprise a body including an annular configuration defining an axis of rotation, a radial direction, and a circumferential direction disposed about the axis of rotation. The body may define an exterior, a thru-hole in communication with the exterior and extending axially through the body, and a blind void disposed annularly about the axis of rotation. The body may further include in a plane including the radial direction, and the axis of rotation, a plurality of segments including a first axially extending segment disposed radially adjacent the thru-hole, being spaced a first radial distance away from the thru-hole, a second axially extending segment being spaced a radial dimension away from the first axially extending segment, and an arcuate segment connecting the first axially extending segment to the second axially extending segment. The arcuate segment may define an axial bottom extremity of the blind void.

A track roller joint assembly according to an embodiment of the present disclosure is provided. The assembly may comprise a track roller including an annular body defining an axis of rotation, a circumferential direction disposed about the axis of rotation, a radial direction extending normal to the axis of rotation, a first axial end disposed along the axis of rotation, and a second axial end disposed along the axis of rotation. The annular body may further define an exterior, a thru-hole in communication with the exterior and extending axially through the annular body, and a blind void disposed annularly about the axis of rotation, the blind void being spaced away from the thru-hole, forming a cantilever portion including a free end. A shaft may be disposed in the thru-hole, and a radial bearing disposed in the thru-hole radially contacting the shaft and the cantilever portion of the track roller.

BRIEF DESCRIPTION OF THE DRAWINGS

The accompanying drawings, which are incorporated in and constitute a part of this specification, illustrate several embodiments of the disclosure and together with the description, serve to explain the principles of the disclosure. In the drawings.

DETAILED DESCRIPTION

Reference will now be made in detail to embodiments of the disclosure, examples of which are illustrated in the accompanying drawings. Wherever possible, the same reference numbers will be used throughout the drawings to refer to the same or like parts. In some cases, a reference number will be indicated in this specification and the drawings will show the reference number followed by a letter for example, 100*a*, 100*b* or by a prime for example, 100', 100" etc. It is to be understood that the use of letters or primes immediately after a reference number indicates that these features are similarly shaped and have similar function as is often the case when geometry is mirrored about a plane of symmetry. For ease of explanation in this specification, letters and primes will often not be included herein but may be shown in the drawings to indicate duplications of features, having similar or identical function or geometry, discussed within this written specification.

A roller joint assembly that may use a track roller or a track roller member according to various embodiments of the present disclosure will now be described. In some embodiments, the track roller is a solid body (e.g. having unitary construction). In other embodiments, the tracker roller is split into two or more track roller member that are assembled together to form the track roller or track roller joint assembly, etc. Other configurations for the track roller, track roller member, and track roller joint assembly are possible in other embodiments of the present disclosure.

Figure 1:
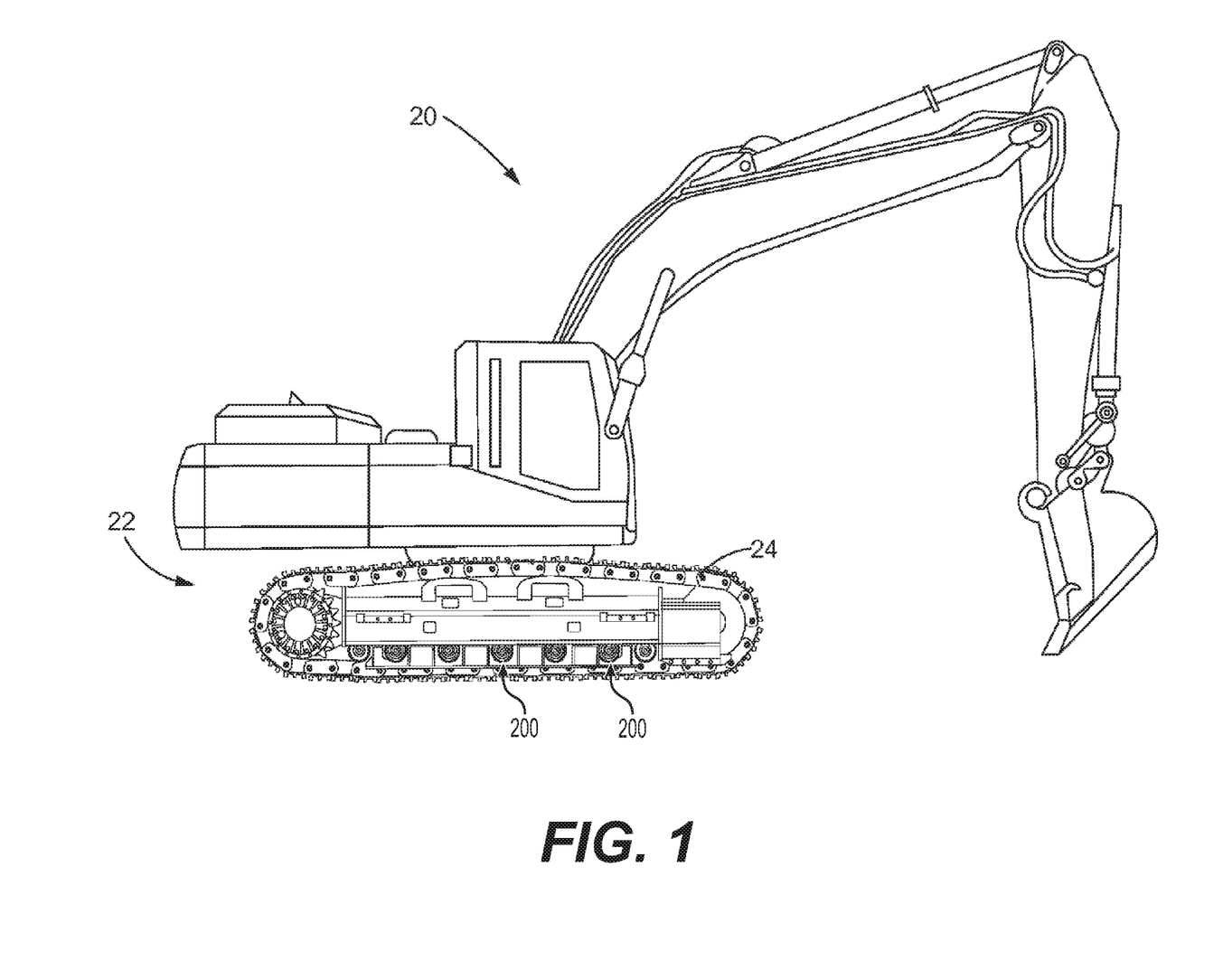
FIG. 1 is a perspective view of a machine such as an excavator that may employ a track assembly (may also be referred to as an undercarriage assembly) with a track roller with reduced stiffness according to an embodiment of the present disclosure.

FIG. 1 shows an embodiment of a tracked machine 20 in the form of an excavator that includes an embodiment of a track roller joint assembly 200 constructed in accordance with principles of the present disclosure. Among other uses, an excavator can be used to remove material using a bucket from a work site.

More specifically, FIG. 1 illustrates a machine 20 including an undercarriage system 22 with a track assembly 24, consistent with certain embodiments of the present disclosure. It is to be understood that although the machine 20 is illustrated as an excavator, the machine 20 may be of any other type that includes a tracked undercarriage system 22. As used herein, the term "machine" refers to a mobile machine that performs a driven operation involving physical movement associated with a particular industry, such as, earthmoving, construction, landscaping, forestry, agriculture, etc.

While the arrangement is illustrated in connection with an excavator, the arrangement disclosed herein has universal applicability in various other types of machines commonly employ track systems, as opposed to wheels. The term "machine" may refer to any machine that performs some type of operation associated with an industry such as mining, earth moving or construction, or any other industry known in the art. For example, the machine may be a hydraulic mining shovel, a wheel loader, a cable shovel, a track type tractor, a dozer, or dragline or the like. Moreover, one or more implements may be connected to the machine. Such implements may be utilized for a variety of tasks, including, for example, lifting and loading.

Figure 2:
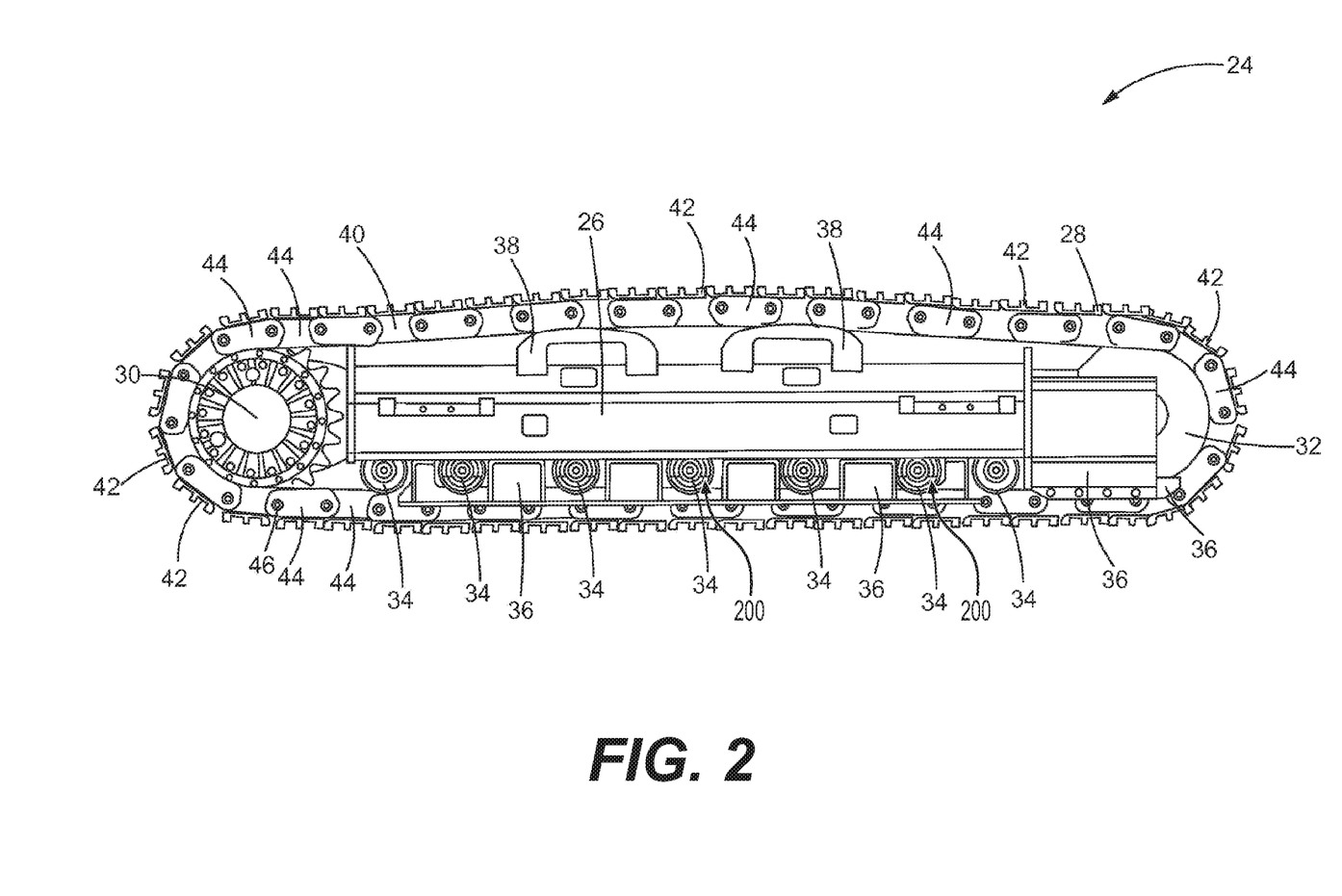
FIG. 2 is a side view of the undercarriage assembly for the machine of FIG. 1.
Figure 3:
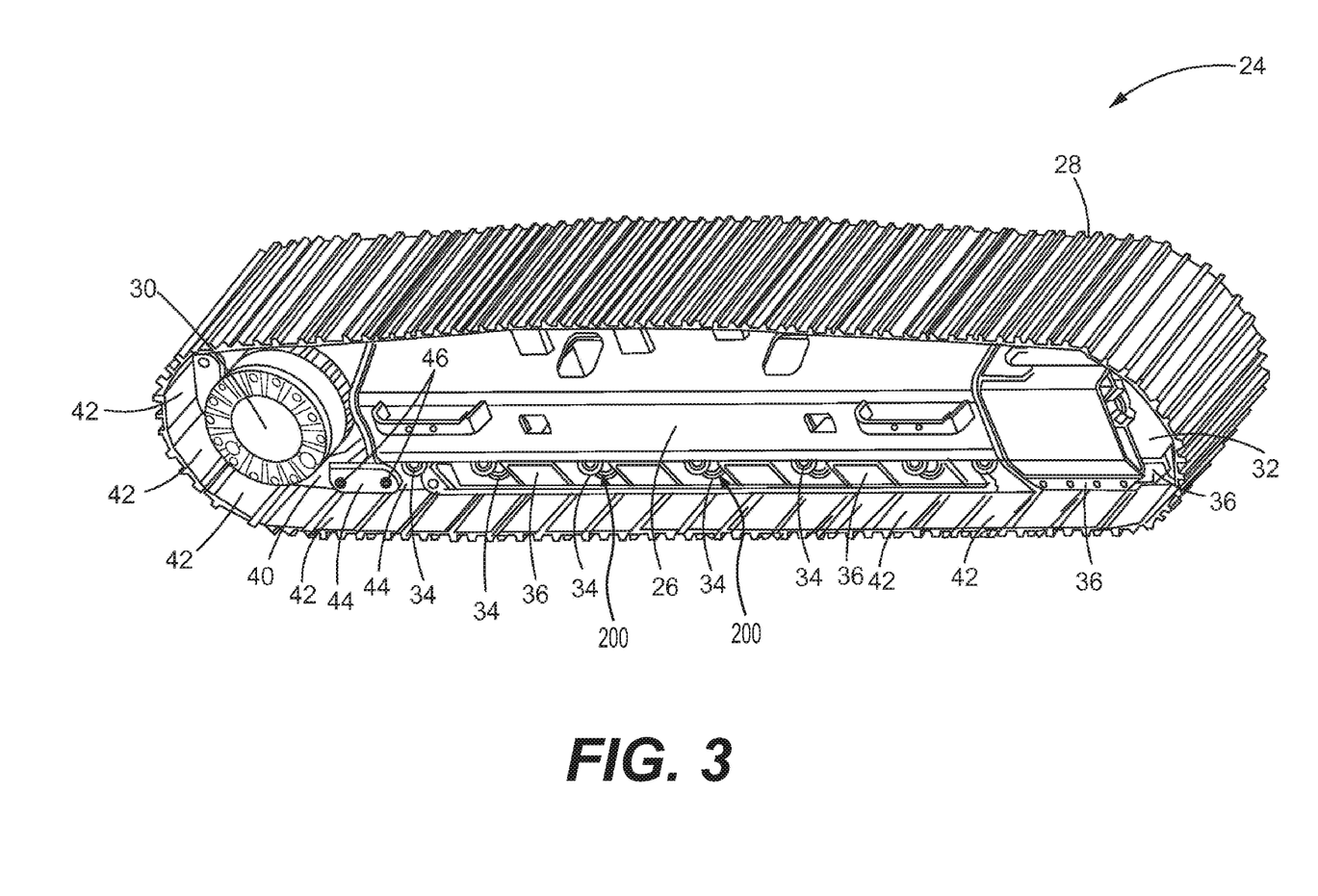
FIG. 3 is a perspective view of the undercarriage assembly of FIG. 2.

The undercarriage system 22 may be configured to support the machine 20 and move the machine 20 along the ground, road, and other types of terrain. As shown in FIGS. 2 and 3, the track assembly 24 of the undercarriage system 22 may include a track roller frame 26, various guiding components connected to the track roller frame 26, and an endless track 28 engaging the guiding components. The guiding components may guide the track 28 and include a drive sprocket 30, an idler 32, rollers 34, track guides 36, and carriers 38, although other components may be used The track 28 may include a link assembly 40 with a plurality of shoes 42 secured thereto. The link assembly 40 may form a flexible backbone of the track 28, and the shoes 42 may provide traction on the various types of terrain. The link assembly 40 may extend in an endless chain around the drive sprocket 30, the rollers 34, the idler 32, and the carriers 38.

As shown in FIGS. 2 and 3, track shoes 42 may be secured to the perimeter of link assembly 40. For example, one shoe 42 may be attached to each laterally spaced pair of links 44. The track shoes 42 may be connected to the links 44 via various methods (e.g. welding, fastening, etc.).

Figure 4:
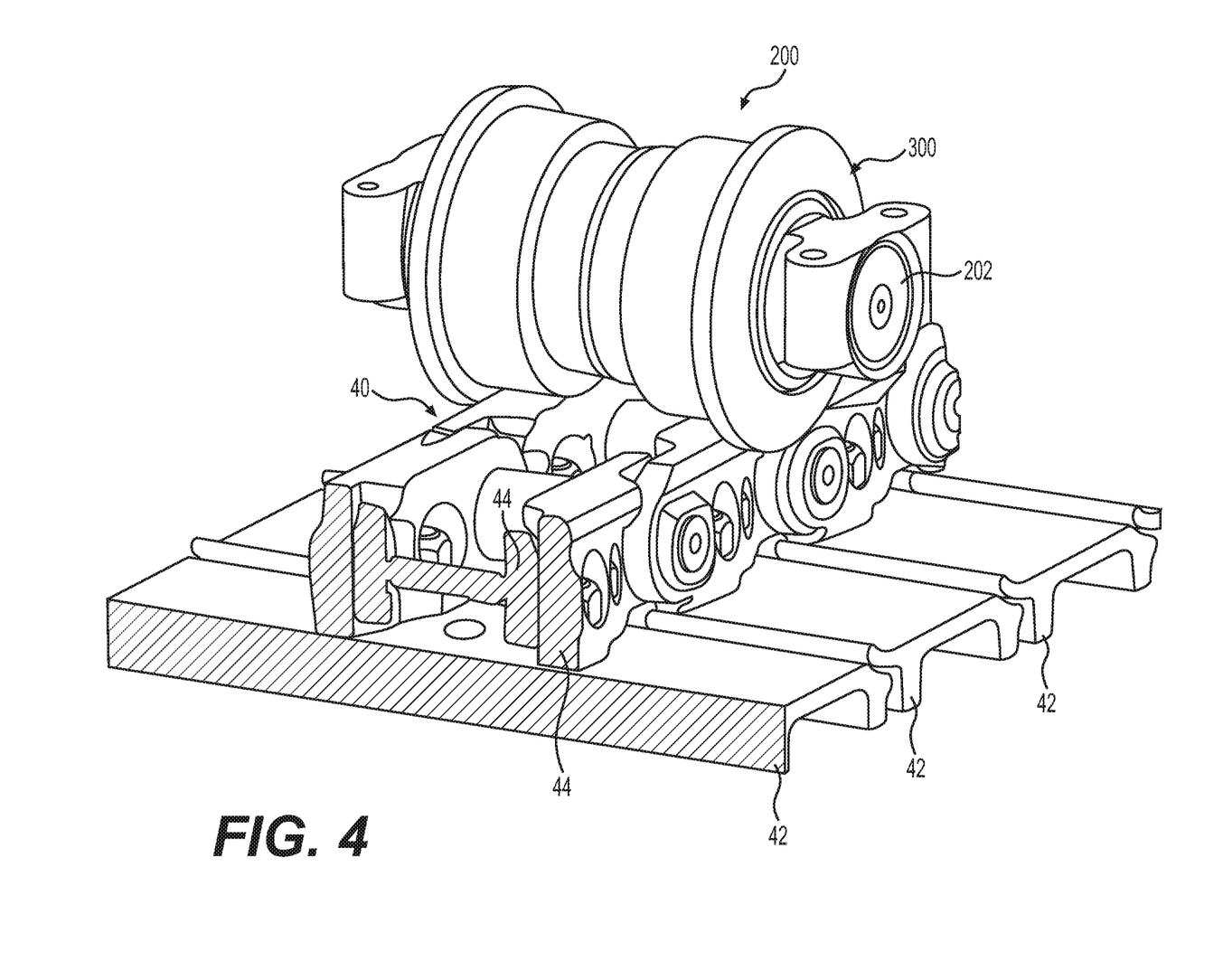
FIG. 4 is a perspective view of a track assembly mating with a track roller with reduced stiffness according to an embodiment of the present disclosure.

As best understood with reference to FIGS. 1 and 4, a plurality of track roller joint assemblies 200 may be provided that guide the track chain assembly. The track roller joint assembly 200 includes shaft 202 extending from the frame (not shown in FIG. 4) of the undercarriage system 22 of the machine 20 on which the track roller 300 rotates.

Figure 5:
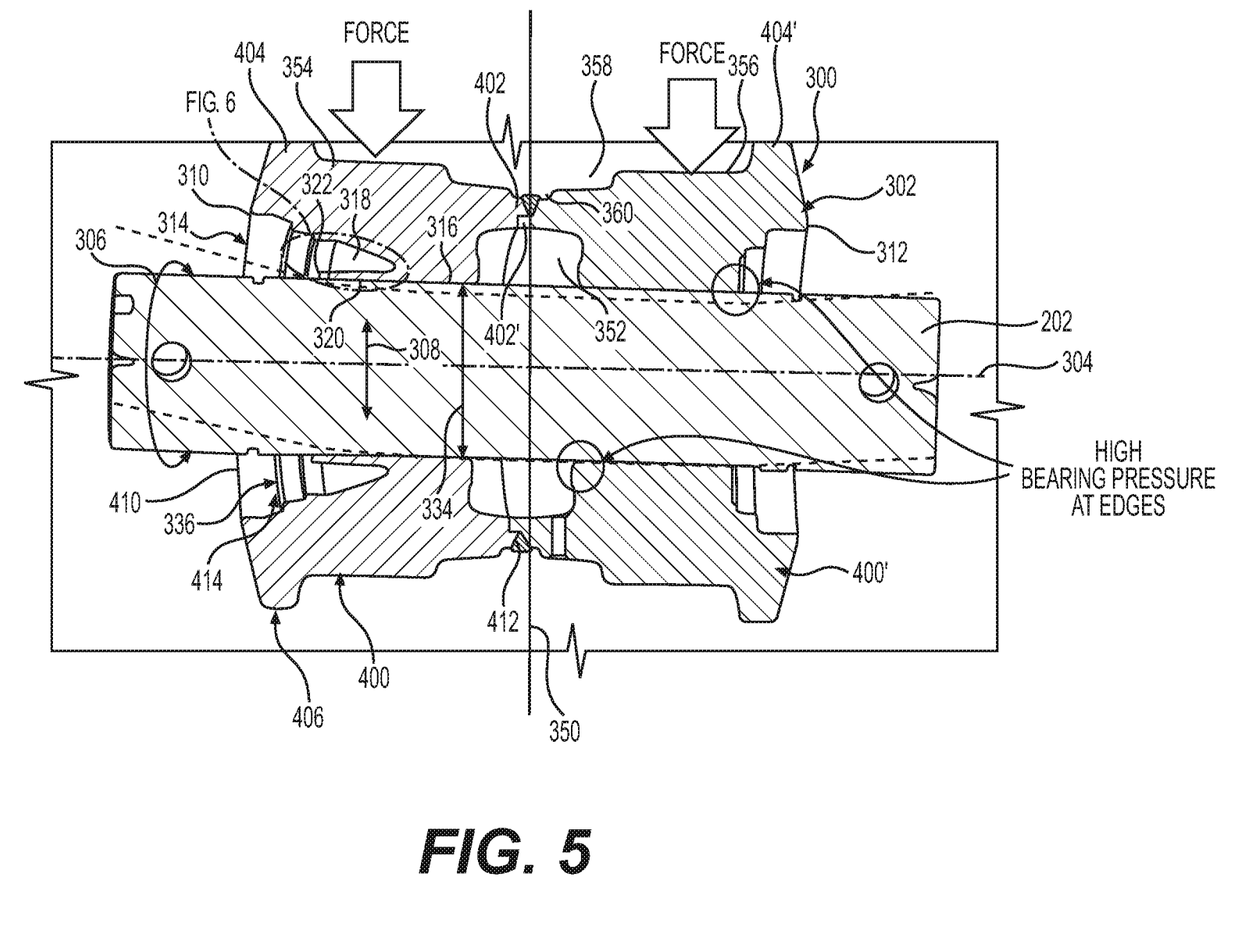
FIG. 5 is a cross-sectional view of the track roller of FIG. 4 taken along lines 5-5 thereof. The left side of FIG. 5, shows a void that reduces the stiffness of the track roller in accordance with the principles of the present disclosure, while the right side of FIG. 5 shows a track roller without such a void as previously known in the art.

Looking now at FIG. 5, it can be seen that the track roller 300 may include an annular body 302 (e.g. at least partially cylindrical, at least partially conical, etc.) defining an axis of rotation 304, a circumferential direction 306 disposed about the axis of rotation 304, and a radial direction 308 extending normal to the axis of rotation 304. A first axial end 310 is disposed along the axis of rotation 304, and a second axial end 312 is disposed along the axis of rotation 304.

As used herein, the terms "axial" or "axially" includes a direction that makes an angle of less than 45 degrees with the axial direction while the terms "radial" or "radially" includes a direction that makes an angle of less than 45 degrees with the radial direction. As used herein, the articles "a" and "an" are intended to include one or more items, and may be used interchangeably with "one or more." Where only one item is intended, the term "one" or similar language is used. Also, as used herein, the terms "has", "have", "having", "with" or the like are intended to be open-ended terms. Further, the phrase "based on" is intended to mean "based, at least in part, on" unless explicitly stated otherwise.

The annular body 302 of the track roller 300 may further define an exterior 314, a thru-hole 316 in communication with the exterior 314 and extending axially through the annular body 302, and a blind void 318 may be disposed annularly about the axis of rotation 304. The blind void 318 is spaced away from the thru-hole 316, forming a cantilever portion 320 including a free end 322. The shaft 202 is disposed in the thru-hole 316, and a radial bearing 204 (best seen in FIG. 6) may be disposed in the thru-hole 316 that radially contacts the shaft 202 and the cantilever portion 320 of the track roller 300.

Figure 6:
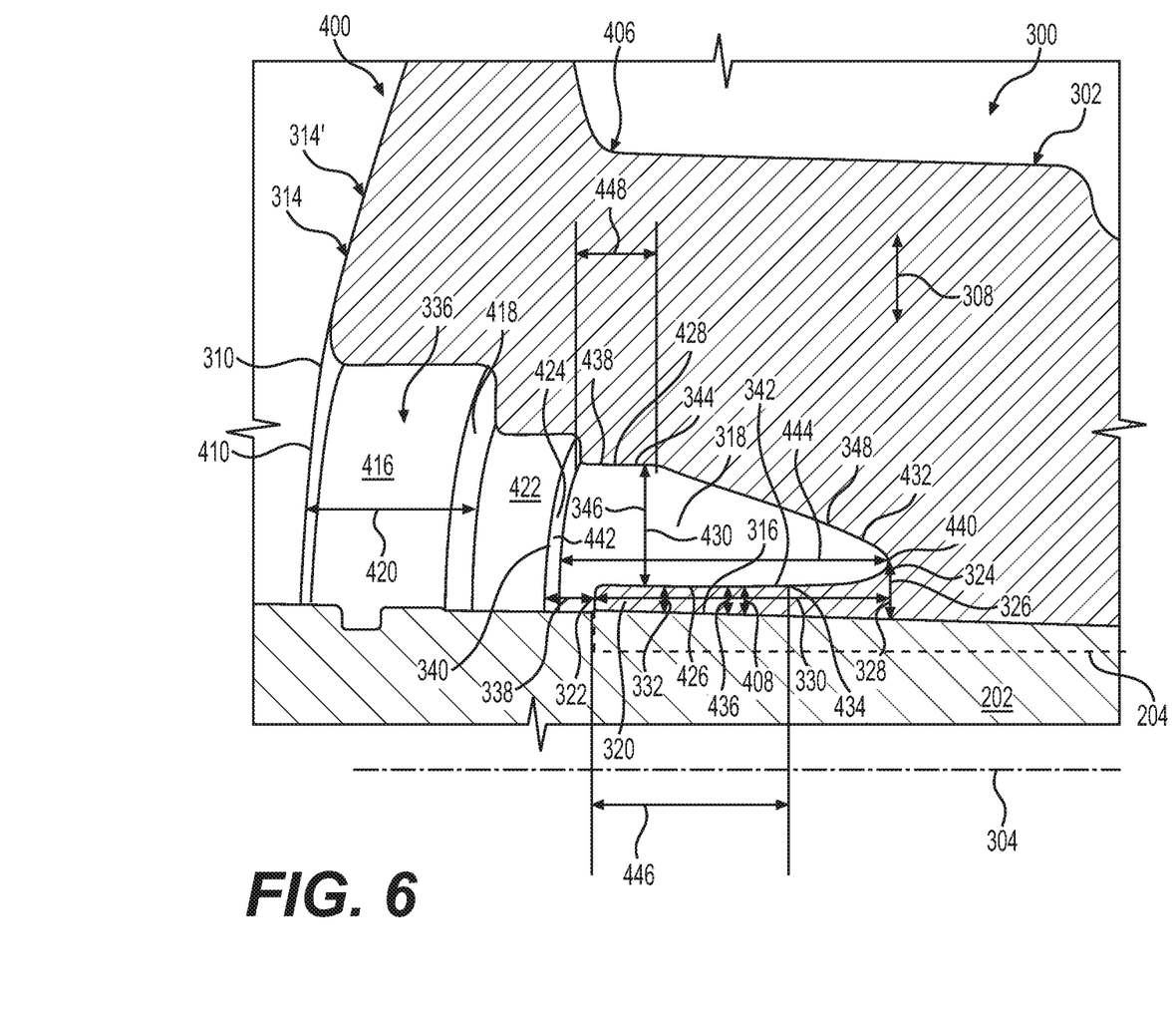
FIG. 6 is an enlarged detail view of the void of the track roller of FIG. 5, illustrating the shape of the void in more detail.

Focusing on FIG. 6, the blind void defines 318 an axial extremity 324 along the axis of rotation 304 at the bottom of the blind void 318, which may act as a flex point 326 for the cantilever portion 320. Hence, a flex radial distance 328 may be measured radially from the axial extremity 324 of the blind void 318 to the thru-hole 316. Similarly, a cantilever axial dimension 330 may be measured axially from the free end 322 of the cantilever portion 320 to the axial extremity 324 of the blind void 318.

As a result of this construction, as shown in FIG. 5, the stiffness or rigidity of the track roller 300 may be reduced (see left side of FIG. 5), which allows the cantilever portion 320, the shaft 202, and the radial bearing 204 to move upwardly, reducing bearing pressures and the resulting wear as compared to a previous design (see right sight of FIG. 5) with a more rigid track roller.

In certain embodiments such as shown in FIG. 6, the blind void 318 is spaced radially away from the thru-hole 316 a radial minimum distance 332, and the thru-hole 316 defines a thru-hole diameter 334 (see FIG. 5). A ratio of the thru-hole diameter 334 to the flex radial distance 328 may range from 4.0 to 9.0, and a ratio of the cantilever axial dimension 330 to the flex radial distance 328 may range from 0.75 to 5.0.

In such embodiments, the radial minimum distance 332 may range from 5.0 mm to 20.0 mm, the thru-hole diameter 334 may range from 35.0 mm to 230.0 mm, the flex radial distance 328 may range from 7.0 mm to 30.0 mm, and the cantilever axial dimension 330 may range from 10.0 mm to 120.0 mm.

It should be noted that these ratios and dimensional ranges may be altered to be different in other embodiments of the present disclosure.

With continued reference to FIGS. 5 and 6, the annular body 302 of the track roller 300 may define a stepped pocket 336 that is axially disposed between the exterior 314 of the annular body 302, and the blind void 318. The stepped pocket 336 may be spaced axially away from the free end 322 of the cantilever portion 320 an axial draft distance 338 ranging from 10.0 mm to 60.0 mm (see FIG. 6). That is to say, the bottom surface 340 of stepped pocket 336 may be drafted such that when the blind void 318 is added, the bottom surface 340 is split to form the free end 322 of the cantilever portion 320. In some embodiments, a mating retaining thrust bearing may be disposed in the pocket. This may not be the case in other embodiments of the present disclosure.

Focusing on the blind void in FIG. 6, it can been appreciated that the blind void 318 is defined by at least three surfaces including a first cylindrical surface 342 at least partially defining the cantilever portion 320, and a second cylindrical surface 344 that is parallel to the first cylindrical surface 342 (appears flat in FIG. 6 but is understood to be annular about the axis of rotation 304), and that is spaced away from the first cylindrical surface 342 a distance 346 that is greater than the flex radial distance 328, and an arcuate surface 348 that is interposed at least partially radially between first cylindrical surface 342 and the second cylindrical surface 344. The arcuate surface 348 may connect directly to the first cylindrical surface 342 and the second cylindrical surface 344, but not necessarily so. For example, one or more curves such as lines (forming conical surfaces) angled relative to the axial direction and/or radii (forming radial surfaces) may connect the arcuate surface 348 to the first cylindrical surface 342 and the second cylindrical surface 344.

As shown in FIG. 6, the arcuate surface 348 may be defined in a plane containing the radial direction 308, and the axis of rotation 304 by a spline or a polynomial following a tangential path in that plane between the arcuate surface 348 and the first and the second cylindrical surfaces 342, 344. Other configurations are possible in other embodiments of the present disclosure.

Referring again to FIG. 5, the annular body 302 of the track roller 300 may define a midplane 350 along the axis of rotation 304, and an annular lubrication void 352 centered axially on the midplane 350 and disposed circumferentially about the shaft 202. Similarly, a first circumferential track link support surface 354, a second circumferential track link support surface 356, and a clearance groove 358 that is disposed axially between the first and the second circumferential track link support surfaces 354, 356 that is centered axially on the midplane 350. In fact, these features may be symmetrical about the midplane but not necessarily so. The load (force) of the machine passes through the first and the second circumferential track link support surfaces 354, 356, creating the bearing pressures previously described herein.

In certain embodiments such as shown in FIG. 5, the track roller 300 may be split into a first track roller member 400, and a second track roller member 400'. The first track roller member 400 may include a first axially extending ridge 402 disposed at the midplane 350, while the second track roller member 400' may include a second axially extending ridge 402' that at least radially or axially abuts the first axially extending ridge 402 of the first track roller member 400. A first rim 404 may be disposed at the first axial end 310 axially proximate to the first circumferential track link support surface 354, and a second rim 404' may be disposed at the second axial end 312 axially proximate to the second circumferential track link support surface 356. The first and the second rims 404, 404' may be configured to keep the track chain assembly on the track roller 300. These rims 404, 404' may also be symmetrical about the midplane 350, but not necessarily so.

A weld groove 360 may also be provided that is in communication with the clearance groove 358 and that is above first axially extending ridge 402 and the second axially extending ridge 402'. A bead of weld may be put in the weld groove 360 to hold the first track roller member 400 and the second track roller member 400' together.

A track roller member 400 according to an embodiment of the present disclosure that may be used as a replacement part or to otherwise assemble a track roller 300 will now be discussed with reference to FIGS. 5 and 6. The track roller member 400 may comprise a body 406 including an annular configuration defining an axis of rotation 304, a radial direction 308, and a circumferential direction 306 disposed about the axis of rotation 304 in a manner similarly described earlier herein.

The body 406 may define a thru-hole 316 extending axially through the body 406 that is centered on the axis of rotation 304, and a blind void 318 disposed annularly about the axis of rotation 304. The blind void 318 may be spaced radially away from the thru-hole 316 a predetermined minimum distance 408, forming a cantilever portion 320 defining a flex point 326, and a flex radial distance 328 measured radially from the flex point 326 to the thru-hole 316.

In certain embodiments, the thru-hole 316 may define a thru-hole diameter 334. A ratio of the thru-hole diameter 334 to the predetermined minimum distance 408 may range from 5.0 to 10.0, while a ratio of the thru-hole diameter 334 to the flex radial distance 328 may range from 4.0 to 9.0. In certain embodiments, the predetermined minimum distance 408 may range from 5.0 mm to 15.0 mm, and the flex radial distance 328 may range from 7.0 mm to 20.0 mm. Other ranges for these ratios and dimensions are possible in other embodiments of the present disclosure.

As best seen in FIG. 5, the body 406 may define a first axial end 410 disposed along the axis of rotation 304, a second axial end 412 disposed along the axis of rotation 304, and further defines a stepped aperture 414 at the first axial end 410.

As best seen in FIG. 6, the body 406 may include a first circumferential wall 416 extending from the first axial end 410, and a first radially extending surface 418 extending radially inwardly from the first circumferential wall 416. The first radially extending surface 418 may be spaced axially away from the first axial end 410 a first axial distance 420. A second circumferential wall 422 may extend axially from the first radially extending surface 418, and a second radially extending surface 424 may extend radially inwardly from the second circumferential wall 422. Other configurations are possible.

As shown in FIG. 6, the blind void 318 is in communication with the stepped aperture 414 and is at least partially defined by the second radially extending surface 424 (e.g. defines the perimeter of the blind void 318). Both the blind void 318 and the stepped aperture 414 may be in communication with the exterior 314'. This may not be true for other embodiments of the present disclosure.

In a plane containing the radial direction 308 and the axis of rotation 304 (as is the case in FIG. 6), it can be seen that the blind void 318 is defined by a first linear segment 426 disposed at the predetermined minimum distance 408 from the thru-hole 316, and a second linear segment 428 spaced radially away from the first linear segment 426 a radial dimension 430 of the blind void 318. An arcuate segment 432 may join the first linear segment 426 to the second linear segment 428. This may not be the case in other embodiments of the present disclosure.

Another embodiment of track roller member 400 that may be provided as a replacement part or to otherwise assembly a track roller 300 will now also be described with reference to FIGS. 5 and 6.

The track roller member 400 may have an exterior 314', and a thru-hole 316 that is in communication with the exterior 314' that extends axially through the body 406.

As best seen in FIG. 6, the body 406 may further include in a plane including the radial direction 308, and the axis of rotation 304, a plurality of segments defining the blind void 318 including a first axially extending segment 434 disposed radially adjacent the thru-hole 316, being spaced a first radial distance 436 away from the thru-hole 316, a second axially extending segment 438 being spaced a radial dimension 430 away from the first axially extending segment 434, and an arcuate segment 432 connecting the first axially extending segment 434 to the second axially extending segment 438. The arcuate segment 432 may define an axial bottom extremity 440 of the blind void 318.

As mentioned previously herein, the thru-hole 316 may define a thru-hole diameter 334, and a ratio of the thru-hole diameter 334 to the radial dimension 430 of the blind void 318 may range from 0.7 to 14.0 in certain embodiments of the present disclosure. In such a case, the radial dimension 430 may range from 15.0 mm to 50.0 mm. Other ratios and dimensions are possible in other embodiments of the present disclosure.

The body 406 may also include a blind void defining surface 442 that extends radially inwardly toward the blind void 318, and a blind void axial depth 444 measured axially from the blind void defining surface 442 to the axial bottom extremity 440 of the blind void 318. The first axial extending segment 434 may define a first axial length 446, and the second axial extending segment 438 may define a second axial length 448. A ratio of the blind void axial depth 444 to the radial dimension 430 of the blind void 318 may range from 0.35 to 7.0, and a ratio of the first axial length 446 to the second axial length 448 may range from 0.5 to 1.0 in certain embodiments.

In such a case, the blind void axial depth 444 may range from 17.5 mm to 100.0 mm, the radial dimension 430 of the blind void 318 may range from 15.0 mm to 50.0 mm, the first axial length 446 may range from 15.0 mm to 75.0 mm, and the second axial length 448 may range from 17.5 mm to 100.0 mm.

For many embodiments, the track roller or track roller member may be cast using iron, grey-iron, steel or other suitable materials. Other materials may be used as well as other manufacturing processes to make the track roller or track roller member such as any type of machining, forging, etc. Also, the configurations of any of the features discussed herein, as well as their dimensions, and/or their ratios of dimensions may be different than what has been specifically stated herein depending on the intended application.

INDUSTRIAL APPLICABILITY

In practice, a track roller, a track roller member, a track roller joint assembly, and an undercarriage assembly according to any embodiment described herein may be sold, bought, manufactured or otherwise obtained in an OEM (Original Equipment Manufacturer) or after-market context.

The various embodiments of the track roller or track roller member may improve the radial bearing life when employed in a track roller joint assembly by providing more flexible geometry for the roller.

It will be apparent to those skilled in the art that various modifications and variations can be made to the embodiments of the apparatus and methods of assembly as discussed herein without departing from the scope or spirit of the invention(s). Other embodiments of this disclosure will be apparent to those skilled in the art from consideration of the specification and practice of the various embodiments disclosed herein. For example, some of the equipment may be constructed and function differently than what has been described herein and certain steps of any method may be omitted, performed in an order that is different than what has been specifically mentioned or in some cases performed simultaneously or in sub-steps. Furthermore, variations or modifications to certain aspects or features of various embodiments may be made to create further embodiments and features and aspects of various embodiments may be added to or substituted for other features or aspects of other embodiments in order to provide still further embodiments.

Accordingly, it is intended that the specification and examples be considered as exemplary only, with a true scope and spirit of the invention(s) being indicated by the following claims and their equivalents.

What is claimed is:
1. A track roller member comprising:
a body including an annular configuration defining an axis of rotation, a radial direction, and a circumferential direction disposed about the axis of rotation, the body defining
  a thru-hole extending axially through the body that is centered on the axis of rotation; and
  a blind void disposed annularly about the axis of rotation, the blind void being spaced radially away from the thru-hole a predetermined minimum distance, forming a cantilever portion defining a flex point and a flex radial distance measured radially from the flex point to the thru-hole;
wherein the thru-hole defines a thru-hole diameter, a ratio of the thru-hole diameter to the predetermined minimum distance ranges from 5.0 to 10.0, and a ratio of the thru-hole diameter to the flex radial distance ranges from 4.0 to 9.0; and
the body defines a first axial end disposed along the axis of rotation, a second axial end disposed along the axis of rotation, and further defines a stepped aperture at the first axial end, the body including
a first circumferential wall extending from the first axial end, a first radially extending surface extending radially inwardly from the first circumferential wall, the first radially extending surface being spaced axially away from the first axial end a first axial distance; and a second circumferential wall extending from the first radially extending surface, and a second radially extending surface extending radially inwardly from the second circumferential wall.

2. The track roller member of claim 1 wherein the blind void is in communication with the stepped aperture and is at least partially defined by the second radially extending surface, the predetermined minimum distance ranges from 5.0 mm to 15.0 mm, and the flex radial distance ranges from 7.0 mm to 20.0 mm.

3. The track roller member of claim 1 wherein the body defines a first axial end disposed along the axis of rotation, a second axial end disposed along the axis of rotation, and an exterior at the first axial end, the blind void is in communication with the exterior; and defines in a plane containing the radial direction and the axis of rotation:
a first linear segment disposed at the predetermined minimum distance from the thru-hole;
a second linear segment spaced radially away from the first linear segment a radial dimension of the blind void; and
an arcuate segment joining the first linear segment to the second linear segment.

4. A track roller joint assembly comprising:
a track roller including a
an annular body defining an axis of rotation, a circumferential direction disposed about the axis of rotation, a radial direction extending normal to the axis of rotation, a first axial end disposed along the axis of rotation, and a second axial end disposed along the axis of rotation, the annular body further defining an exterior;
a thru-hole in communication with the exterior and extending axially through the annular body; and
a blind void disposed annularly about the axis of rotation, the blind void being spaced away from the thru-hole, forming a cantilever portion including a free end;
a shaft disposed in the thru-hole; and
a radial bearing disposed in the thru-hole radially contacting the shaft and the cantilever portion of the track roller;
wherein the annular body of the track roller defines a stepped pocket that is axially disposed between the exterior of the annular body and the blind void.

5. A track roller member comprising:
a body including an annular configuration defining an axis of rotation, a radial direction, and a circumferential direction disposed about the axis of rotation, the body defining
an exterior;
a thru-hole in communication with the exterior and extending axially through the body; and
a blind void disposed annularly about the axis of rotation; and
wherein the body further includes in a plane including the radial direction, and the axis of rotation, a plurality of segments defining the blind void, including a first axially extending segment disposed radially adjacent the thru-hole, being spaced a first radial distance away from the thru-hole, a second axially extending segment being spaced a radial dimension away from the first axially extending segment, and an arcuate segment connecting the first axially extending segment to the second axially extending segment, the arcuate segment defining an axial bottom extremity of the blind void, and the body further defines a stepped aperture that is interposed between the blind void and the exterior.

6. The track roller member of claim 5 wherein the blind void is in communication with the exterior of the body.

7. The track roller member of claim 5 wherein the thru-hole defines a thru-hole diameter, and a ratio of the thru-hole diameter to the radial dimension of the blind void ranges from 0.7 to 14.0.

8. The track roller member of claim 7 wherein the radial dimension ranges from 15.0 mm to 50.0 mm, and the body includes a blind void defining surface that extends radially inwardly toward the blind void, and defines a blind void axial depth measured axially from the blind void defining surface to the axial bottom extremity of the blind void, the first axial extending segment defines a first axial length, the second axial extending segment defines a second axial length, a ratio of the blind void axial depth to the radial dimension of the blind void ranges from 0.35 to 7.0, and a ratio of the first axial length to the second axial length ranges from 0.5 to 1.0.

9. The track roller member of claim 8 wherein the blind void axial depth ranges from 17.5 mm to 100.0 mm, the radial dimension of the blind void ranges from 15.0 mm to 50.0 mm, the first axial length ranges from 15.0 mm to 75.0 mm, and the second axial length ranges from 17.5 mm to 100.0 mm.

10. The track roller joint assembly of claim 4 wherein the stepped pocket is spaced axially away from the free end of the cantilever portion an axial draft distance ranging from 10.0 mm to 60.0 mm.

11. The track roller joint assembly of claim 4 wherein the blind void defines an axial extremity along the axis of rotation at a bottom of the blind void, a flex radial distance measured radially from the axial extremity of the blind void to the thru-hole, and a cantilever axial dimension measured axially from the free end of the cantilever portion to the axial extremity of the blind void.

12. The track roller joint assembly of claim 11 wherein the blind void is spaced radially away from the thru-hole a radial minimum distance, and the thru-hole defines a thru-hole diameter, a ratio of the thru-hole diameter to the flex radial distance ranges from 4.0 to 9.0, and a ratio of the cantilever axial dimension to the flex radial distance ranges from 0.75 to 5.0.

13. The track roller joint assembly of claim 12 wherein the radial minimum distance ranges from 5.0 mm to 20.0 mm, the thru-hole diameter ranges from 35.0 mm to 230.0 mm, the flex radial distance ranges from 7.0 mm to 30.0 mm, and the cantilever axial dimension ranges from 10.0 mm to 120.0 mm.

14. The track roller joint assembly of claim 11 wherein the annular body of the track roller defines the blind void with at least three surfaces including
a first cylindrical surface at least partially defining the cantilever portion;
a second cylindrical surface that is parallel to the first cylindrical surface and that is spaced away from the first cylindrical surface a distance that is greater than the flex radial distance; and
an arcuate surface interposed at least partially radially between first cylindrical surface and the second cylindrical surface.

15. The track roller joint assembly of claim 14 wherein the arcuate surface is defined in a plane containing the radial direction and the axis of rotation by a spline or a polynomial.

16. The track roller joint assembly of claim 4 wherein the annular body of the track roller defines a midplane along the axis of rotation, an annular lubrication void centered axially on the midplane and disposed circumferentially about the shaft, a first circumferential track link support surface, a second circumferential track link support surface, and a clearance groove disposed axially between the first and the second circumferential track link support surfaces that is centered axially on the midplane.

17. The track roller joint assembly of claim 16 wherein the track roller is split into a first track roller member, and a second track roller member, the first track roller member including a first axially extending ridge disposed at the midplane, the second track roller member including a second axially extending ridge that at least radially or axially abuts the first axially extending ridge of the first track roller member, a first rim disposed at the first axial end axially proximate to the first circumferential track support surface, and a second rim disposed at the second axial end axially proximate to the second circumferential track support surface.

* * * * *